United States Patent [19]

Bleckmann et al.

[11] 4,375,599
[45] Mar. 1, 1983

[54] METHOD AND CIRCUIT FOR THE CONVERSION OF VARIABLE PHYSICAL QUANTITIES OCCURRING IN VEHICLES REPRESENTED AS FREQUENCIES INTO NUMERICAL VALUES OR SIGNALS PROPORTIONAL TO THE FREQUENCIES

[75] Inventors: Hans W. Bleckmann, Frankfurt am Main, Fed. Rep. of Germany; Heinz Loreck, Moedling, Austria

[73] Assignee: ITT Industries, Inc., New York, N.Y.

[21] Appl. No.: 214,386

[22] Filed: Dec. 8, 1980

[30] Foreign Application Priority Data

Dec. 21, 1979 [DE] Fed. Rep. of Germany ....... 2951755

[51] Int. Cl.³ .......................... H03K 9/06; H03K 5/08; B60T 8/02
[52] U.S. Cl. .................................... 307/519; 328/140; 328/167; 318/127; 307/360; 307/543
[58] Field of Search ...................... 307/519, 543, 360; 328/140, 167, 127

[56] References Cited

U.S. PATENT DOCUMENTS 3,652,134 3/1972 Hiscox ............................ 307/519 X
3,852,616 12/1974 Carp et al. ...................... 307/519 X
3,870,898 3/1975 Hoehn ................................. 307/519
4,243,940 1/1981 Ruof .................................... 328/140

Primary Examiner—John S. Heyman
Attorney, Agent, or Firm—John T. O'Halloran; Alfred C. Hill

[57] ABSTRACT

Converters are known where input pulses are coupled to a detector stage via an adding device and a first integrating register. The detector stage provides an output signal relative to threshold values which increases, keep constant or reduce the contents of a second integrating register. The contents of the second register are coupled to the minus input of the adding device. The time variation of the input pulses may be coupled from the detector stage. According to the present invention the dynamic behavior, stability and suppression of disturbances is improved by differentiating the input pulse train, coupling this pulse train to the detector stage and to integrate the output of the detector stage with the integration factor being constantly adjusted to the output signal of the detector stage.

22 Claims, 5 Drawing Figures

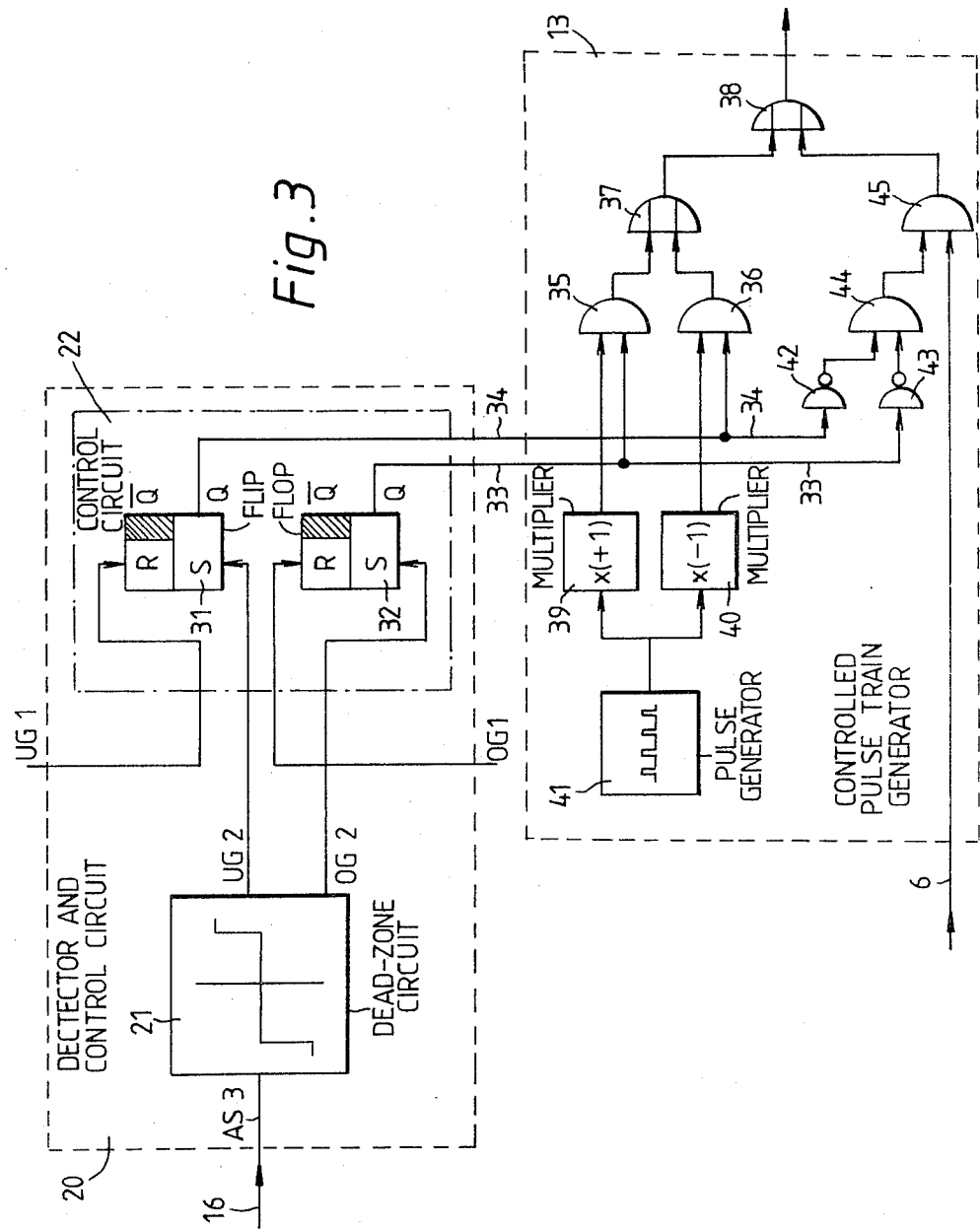

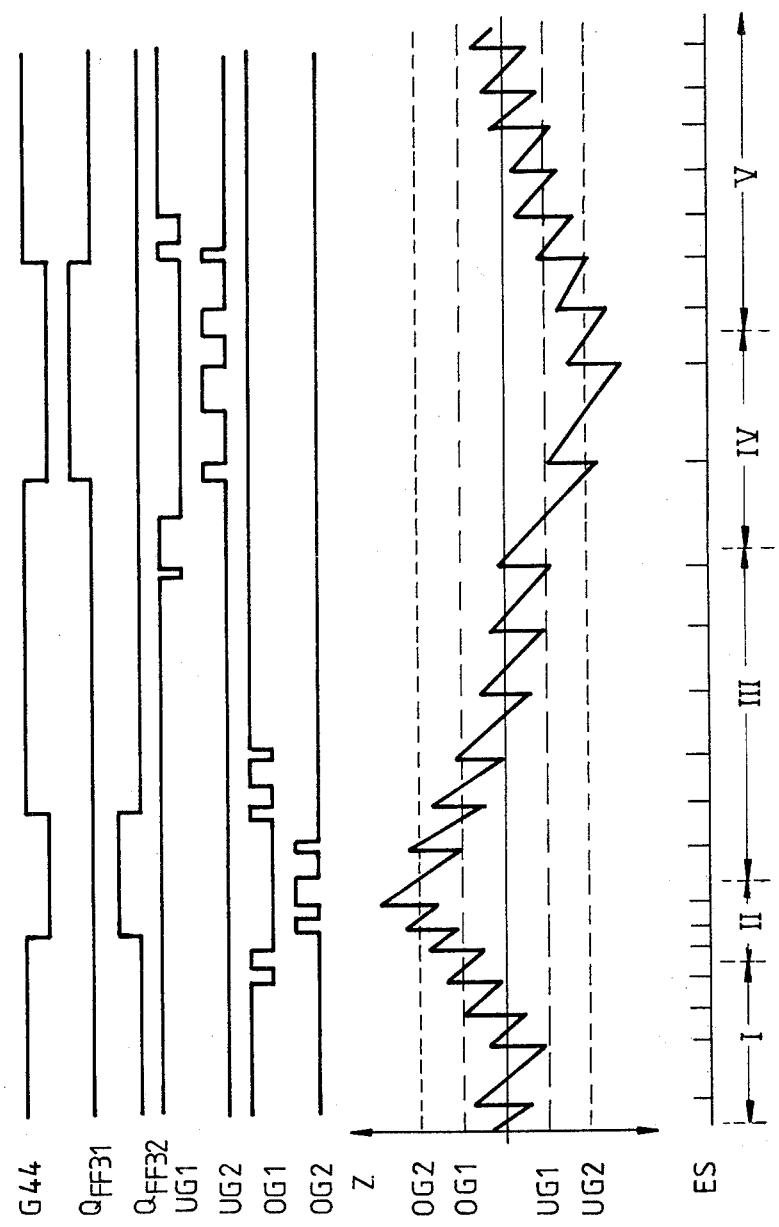

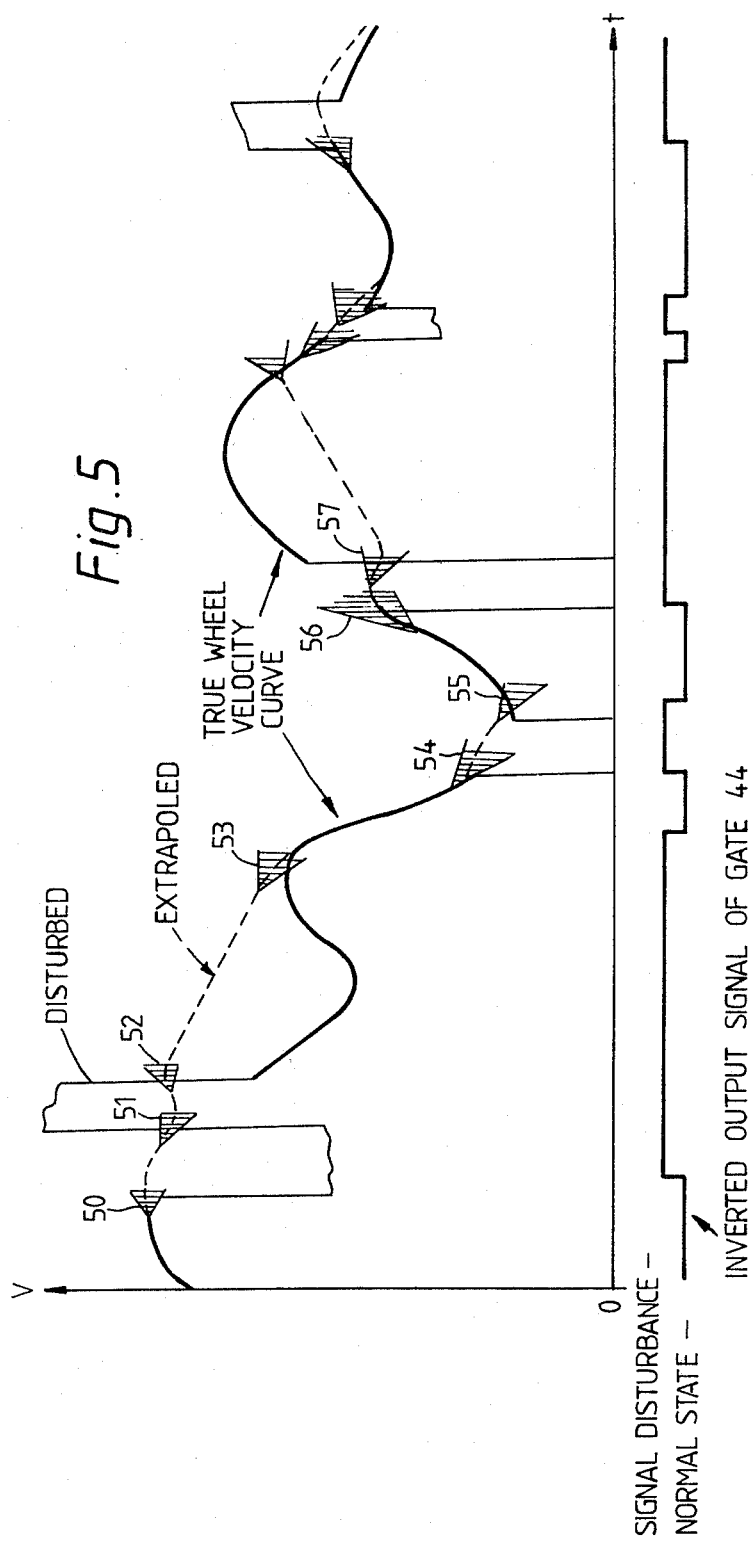

METHOD AND CIRCUIT FOR THE CONVERSION OF VARIABLE PHYSICAL QUANTITIES OCCURRING IN VEHICLES REPRESENTED AS FREQUENCIES INTO NUMERICAL VALUES OR SIGNALS PROPORTIONAL TO THE FREQUENCIES

BACKGROUND OF THE INVENTION

The present invention relates to a method for the conversion of variable physical quantities occurring in vehicles, represented as, frequencies and at least temporarily disturbed, into numerical values or signals proportional to the frequencies and suitable for immediate further processing. Moreover, the present invention is related to a circuit for use, in particular, with antiskid systems for automotive vehicles for implementing this method.

Typical examples of application possibilities of such a method are the fuel-injection control in a motor vehicle engine which is accomplished dependent on the rotational frequency of the crankshaft, the spark advance or retard control which is responsive to the same variable physical quantity, as well as antiskid control systems in which as a variable physical quantity the rotational speed of each individual wheel and time derivatives of this rotational speed, for example, the acceleration of each individual wheel, are sensed.

From German Patent DE-OS No. 2,519,867 a closed-loop control system is known which converts a signal, which is frequency-modulated in response to a variable physical quantity, into a value proportional to this physical quantity, the closed-loop control system comprising a comparator including an integrator driven by a subtractor and a dead-zone circuit, with the frequency-modulated signal being supplied to one input of the subtractor while the output signal of a filtering means inserted downstream from the comparator is supplied to the other input of the subtractor, and the dead-zone circuit issues three distinct output signals dependent on whether the integrator's output signal is below a predetermined lower threshold level, above a predetermined upper threshold level, or between these thresholds. In this arrangement, the filtering means comprises essentially a memory likewise operating as an integrator and a paralleled unit acting as a coefficient former having its output signal combined with the output signal of the memory by an adder stage generating the output signal of the filtering means. This known arrangement leaves much to be desired in terms of both its dynamic action and stability.

In order to obtain an optimum dynamic action in such arrangements, it is necessary to reach maxima in high resolution of time, quick response action and good stability of the system. Since these are contradicting requirements, compromises have to be sought which, however, must not lead to the introduction of instabilities into the system.

SUMMARY OF THE INVENTION

Therefore, it is an object of the present invention to improve upon the method mentioned hereinabove so as to permit a substantially increased resolution and an improved response action without impairing the stability of the system while at the same time suppressing interferences.

Another object of the present invention is to provide a circuit to carry out the method of the present invention.

A feature of the present invention is the provision of a method for the conversion of a variable physical quantity occurring in a vehicle represented by frequency variations being temporarily disturbed at times into a numerical signal proportional to the frequency variations suitable for further processing comprising the steps of: converting the frequency variations into signals corresponding to a time derivative of the physical quantity for comparison to predetermined threshold values; and integrating and transforming the frequency variations and the converted signals combined therewith as a feedback signal to generate the numerical signals, the numerical signals being generated on the basis of the instantaneous value of the converted signals with a change of transfer characteristic whenever the converted signals are outside of the predetermined threshold values.

These measures make it possible to respond very early to changes of the physical quantity or of the input signal indirectly representing this quantity and to suitably adapt the conversion characteristic in the necessary manner which, putting this method into practice, may manifest itself, for example, by the fact that an integrating filter of a specific order is assigned a lower order in the event of disturbances occurring and is thus shifted from quick-response action to slow-response action, with the disturbance in the values intended for further processing being largely suppressed.

As a time derivative, the first or the second derivative of the signal corresponding to the variable physical quantity may be suitably used. In a preferred embodiment of the method of the present invention, i.e., in an antiskid control system for motor vehicle brakes in which as the variable physical quantity the rotational speed of a wheel is sensed and evaluated, the second time derivative of this physical quantity is the change in acceleration occurring at the wheel which is also termed a jerk.

In this embodiment of the method of the present invention, it is thus possible to choose the threshold levels such that a jerk signal exceeding these threshold levels can be immediately identified as a disturbance since it may occur, for instance, as a result of a loose contact in a line connecting a wheel sensor with a control circuit, or the pick-up of high-frequency electromagnetic extraneous signals. Such disturbances have such a strong effect on the signal representative of the wheel acceleration in terms of time that the resultant values of the derivative of these acceleration signals attain magnitudes not physically possible in motor vehicles.

Such a comparison of the second time derivative of the velocity signal with predetermined threshold levels thus affords a simple and reliable method of determining the time at which the transfer characteristic has to be varied on signal conversion in order to ensure that the value destined for further processing is largely free from disturbances and corresponds as closely as possible to the actual value of the physical quantity, for example, the wheel rotational speed.

It will be particularly advantageous if, according to the present invention, the continuous comparison of the time derivative of the physical quantity with threshold levels permitting the disturbance to be detected is combined with another comparison of this signal representative of the time derivative with lower threshold levels, permitting minor "disturbances" to be ignored, such as may occur in connection with wheel velocity signals, for example, as a result of sensor inaccuracies or rapidly succeeding minor accelerations and decelerations called "hunting", or since they are unavoidable as "quantization errors" in a physical input variable represented as pulse repetition frequency.

Another feature of the present invention is the provision of a circuit for converting a variable physical quantity occurring in a vehicle represented by frequency variations being temporarily disturbed at times into a numerical signal proportional to the variations for further processing comprising: a comparator including a subtractor having a negative input and a positive input, the positive input receiving a pulse train whose frequency varies proportional to the physical quantity, a first integrator coupled to the output of the subtractor, and a dead-zone detector coupled to the output of the first integrator, the dead-zone detector providing a first distinct output signal when the output signal of the first integrator is below a predetermined first lower threshold level, a second distinct output signal when the output signal of the first integrator is above a predetermined first upper threshold level, and a third distinct output signal when the output signal of the first integrator is between the first lower and the first upper threshold levels; a filtering means of the n-th order coupled to the output of the dead-zone detector having an output coupled to the negative input, where n is an integer greater than zero, the filtering means including at least one section having a variable transfer characteristic; and a detector and control circuit coupled to the dead-zone detector and the one section to detect a signal representative of a time derivative of a value proportional to the physical quantity and to provide a control signal for the one section to vary the transfer characteristic if the time derivative signal departs from an area bounded by a predetermined second lower threshold level and a predetermined second upper threshold level, the first lower and the first upper threshold levels lying within the second lower and the second upper threshold levels.

Ordinal number n of the filtering means is preferably greater than or equal to 1, in particular equal to 2, with the signal sensed by the detector and control circuit being the first or second time derivative of the value proportional to the variable physical quantity.

In the event of the use of a second-order filtering means, the above circuit is regarded as a third-order closed-loop control system which is characterized by a particularly quick response action while affording high stability, which, however, in the event of a disturbance sensed by the detector and control circuit is assigned a lower order, i.e., becomes a second or first-order closed-loop control system by the weight of the portions determining the higher order becoming reduced, the result being in the embodiment of the present invention a slower response action of the filtering means. Thereby the input signal of the circuit which has the high-frequency interferences superimposed on it is filtered to a greater extent whereby these interferences are largely suppressed at the output. True, the filtering means has, in the periods in which it is slowed down by the response of the detector and control circuit, a lower time resolution so that it is no longer able to trace in detail all actual variations of the relevant physical quantity. Yet, the filtering means continues supplying an output signal representative of the global pattern of this physical quantity with a sufficient amount of accuracy, the output signal being suitable for further evaluation with very good success at least whenever the disturbances occur only during relatively short periods. Thus, by means of this circuit, in conformity with the method of this invention, the dynamic action of the n-th order filtering means is optimized to the effect that it shows a very quick response action and a very high resolution during all those periods in which the input signal acts "normally", i.e., remains within the area which alone is physically meaningful, so that its output signal renders in true detail and with a very small time lag only the variations of the physical quantity contained in the input signal as frequency modulation. However, as soon as the input signal has superimposed thereon high-frequency interferences, a detail reproduction of this signal would result in an output signal at the filter output containing equally very high interference portions. To suppress these, the invention provides for temporary abandonment of the otherwise desirable high time resolution, the filtering means being shifted to a slower response action until the interference has again disappeared.

The section which is variable in its transfer characteristic and by means of which the filter order or the order of the closed-loop control system containing the filtering means is varied, comprises preferably a proportional section and a constant-signal generator, wherein the proportional section is energized in the "normal case", i.e., with no drive signal from the detector and control circuit being applied, while the constant-signal generator is inserted in the filtering means when a "disturbance" has occurred and the detector and control circuit has responded, the proportional section being de-energized simultaneously.

By means of the constant-signal generator a pulse train is preferably predetermined such that it corresponds to a specific fixed acceleration during the subsequent integration operation. By the allocation of a sign digit, a fixed positive or negative acceleration can be predetermined, i.e., an extrapolation signal is fed into the filtering means in place of the disturbed signal, enabling the output signal during the generally relatively short duration of the disturbance to be continued as would have been expected without the occurrence of the disturbance.

Using, for instance, the circuit of the present invention as a closed-loop control system in an antiskid system, it is possible to provide a global pattern of the true wheel velocity signal that is essentially always correctly reproduced or determined, even under the influence of high-intensity disturbances.

BRIEF DESCRIPTION OF THE DRAWING

Above-mentioned and other features and objects of this invention will become more apparent by reference to the following description taken in conjunction with the accompanying drawing, in which:

FIG. 3 is a detailed block diagram of a portion of FIG. 2;

FIG. 4 is a diagram illustrating signals at various points in the circuit of FIGS. 2 and 3; and FIG. 5 is a graph in which true wheel velocity is plotted against time and which also shows the extrapolated signal produced by the closed-loop control system of the present invention at the filter output as a result of signal interferences.

DESCRIPTION OF THE PREFERRED EMBODIMENT

Figure 1:
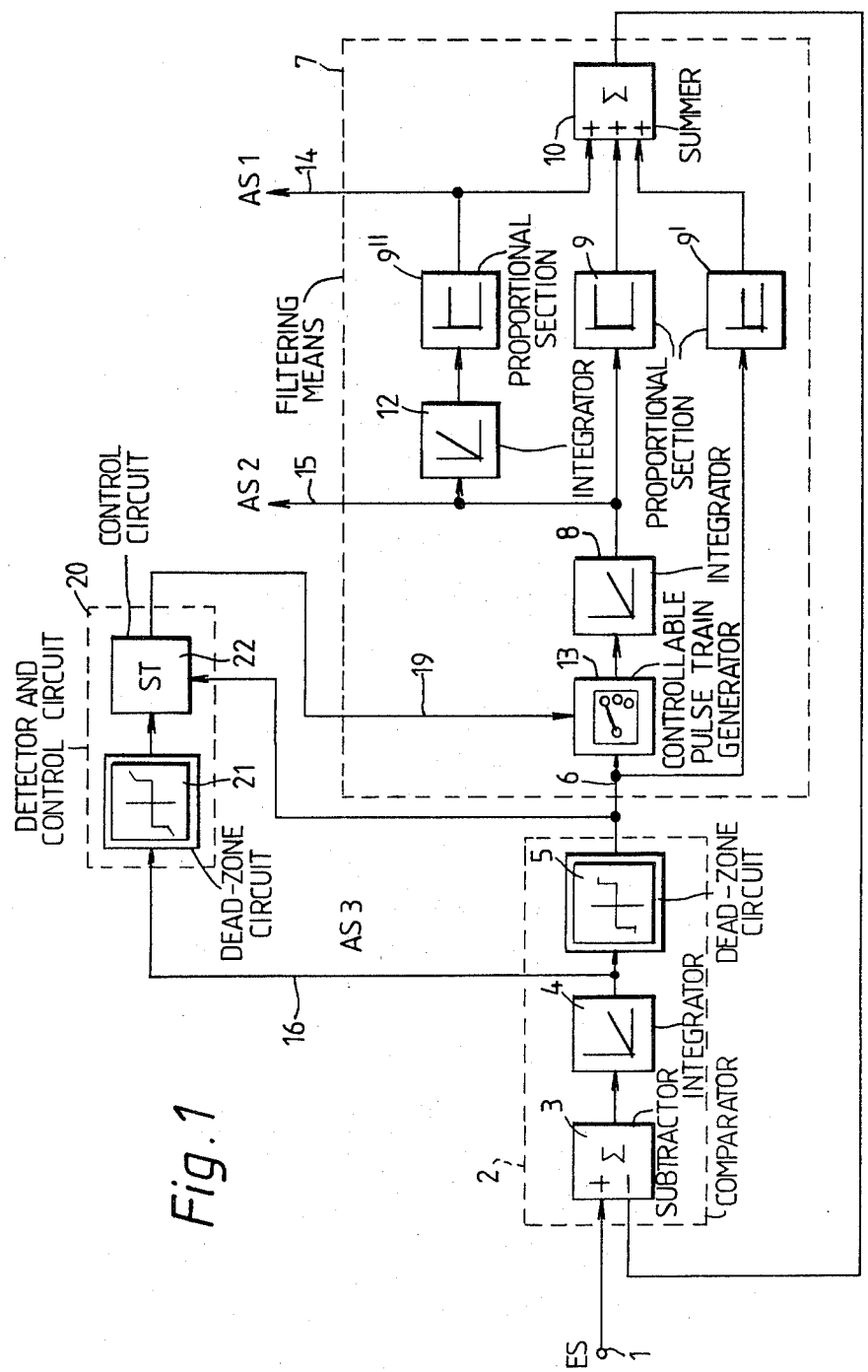
FIG. 1 is a general block diagram of a closed loop control system according to the principles of the present invention.

Referring to FIG. 1, the closed-loop control system has a signal ES applied to input terminal 1 having impressed thereon the time pattern of a variable physical quantity in the form of a frequency modulation. Signal ES is supplied to the positive input of a subtractor 3 forming the input stage of a comparator 2. The output of subtractor 3 is coupled to an integrator 4 followed by a dead-zone circuit 5. Dead-zone circuit 5 is a discriminator defining, respectively, a first upper and a first lower threshold level OG 1 and UG 1 and issuing on line 6 three distinct output signals, depending on whether the output signal of integrator 4 is above the upper threshold level, below the lower threshold level, or between these two thresholds.

Line 6 connects the output of dead-zone circuit 5 to a filtering means 7 which includes a network of integrators and coefficient formers and may have its configuration adapted to the individual application.

Filtering means 7 of FIG. 1 comprises three branches, the first one of which includes a controllable pulse-train generator 13, an integrator 8 and a proportional section 9 connected in series with line 6 at the output of integrator 8. The output signal of this branch is supplied to one of the three inputs of a summer stage 10.

The second filter branch includes a proportional section 9' likewise connected to line 6 and having its output signal supplied to the second input of summer stage 10.

The input signal for the third filter branch, which includes an integrator 12 and a proportional section 9" connected in series, is taken from between integrator 8 and proportional section 9 of the first filter branch. The output signal of proportional section 9" is applied to the third input of summer stage 10 whose output signal is fed back to the subtracting input of subtractor 3 of comparator 2 closing the control loop.

The output signal of proportional section 9" inserted downstream from integrator 12 is representative of the time pattern of the variable physical quantity represented by frequency modulation of input signal ES, and is available at terminal 14 for further processing as output signal AS 1.

The output signal of integrator 8 represents the first time derivative of signal AS 1 and is available at terminal 15 as output signal AS 2.

Because the whole configuration is a third-order closed loop, it is possible to obtain at the output of integrator 4 the second time derivative of signal AS 1 in the form of signal AS 3 which in the exemplary embodiment shown is supplied to the input of a detector and control circuit 20 through a line 16 for further processing.

The input stage of detector and control circuit 20 is a second dead-zone circuit 21 defining an upper threshold level OG 2 and a lower threshold level UG 2, these thresholds being symmetrical above and below the respective thresholds of dead-zone circuit 5.

As long as signal AS 3 remains within the threshold levels OG 2 and UG 2 predetermined by dead-zone circuit 21, detector and control circuit 20 will not become activated. In this case, the signals transmitted to filtering means 7 by dead-zone circuit 5 and occurring in the event of the threshold levels of dead-zone circuit 5 being exceeded will be processed in filtering means 7 which is in the "normal state", thus ensuring a quick response action while at the same time minor interferences are suppressed or eliminated.

However, if signal AS 3 exceeds one of the two threshold levels OG 2 or UG 2 predetermined by dead-zone circuit 21, which is equivalent to the existence of a disturbance, controllable pulse train generator 13 will be energized which has the effect of lowering the order of filtering means 7, thereby varying the response action and largely suppressing or eliminating in output signal AS 1 the interference contained in input signal ES. Controllable pulse-train generator 13, which normally allows passage of the signals arriving from dead-zone circuit 5 unchanged, will be shifted to operating states in which specific predeterminable transfer characteristics become effective, in dependence on whether the upper or lower threshold level of dead-zone circuit 21 is exceeded. These different transfer characteristics may operate to just allow passage of the signal arriving on line 6 in the normal state while in the presence of a disturbed condition, which is defined by detector and control circuit 20, the signal arriving on line 6 is either varied or completely blocked with specially produced signals being supplied instead.

Figure 2:
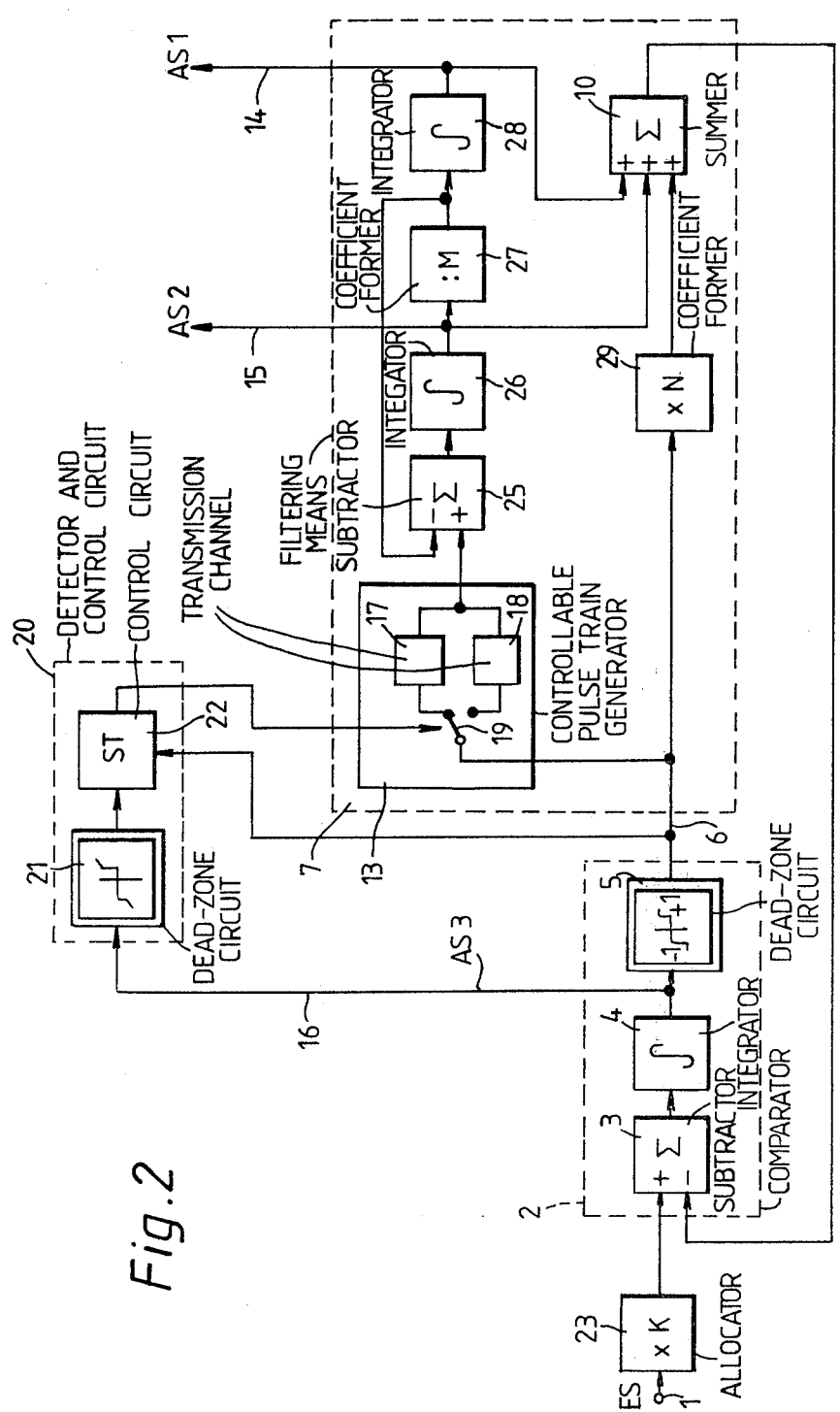
FIG. 2 is a block diagram of a digital closed-loop control system according to the principles of the present invention for a motor vehicle antiskid control system.

In FIG. 2 a digital closed-loop control system is shown that can be employed in an antiskid system for motor vehicle brakes.

The basic design of this circuit corresponds to the circuitry illustrated in FIG. 1. Thus, the circuit of FIG. 2 likewise comprises a comparator 2 which is combined with a filtering means 7 to form a closed control loop. A detector and control circuit 20 is provided which drives a controllable pulse-train generator 13 ensuring three distinct "transfer characteristics" and determines which among three possible operating states pulse-train generator 13 is required to assume.

Although the whole system of FIG. 2 is a clocked system, master clocks and the like have been omitted for purposes of clarity.

As shown in FIG. 2, the digital circuit of the closed-loop control system provides for assignment of a predetermined fixed numerical value to each of the pulses forming the input signal ES, originating from the wheel sensor and containing, because of their variable distance of time therebetween the wheel velocity as well as its time derivatives, such assignment being made by an allocator 23 multiplying the arriving signal by a factor, with the predetermined fixed numerical value being added by a positive sign digit to the contents of integrator 4 operating as an accumulator register via subtractor 3. The output signal of integrator 4 which corresponds to the derivative of acceleration is, on the one hand, monitored by dead-zone circuit 5 predetermining the first two threshold levels, on the other hand, it is supplied to detector and control circuit 20 through line 16.

Dead-zone circuit 5 is designed as a discriminator issuing a zero signal on line 6 as long as the contents of integrator 4 remain within an upper OG 1 and a lower UG 1 threshold level. When upper threshold OG 1 is exceeded, a signal +1 will appear at the output of dead-zone circuit 5, whereas an output signal −1 will occur when lower threshold UG 1 is exceeded.

Via line 6, the output signals of dead-zone circuit 5 are transmitted to filtering means 7 which in the present case comprises two integrators 26 and 28 and, accordingly, is of the second order.

Provided directly at the input of filtering means 7 is a controllable pulse-train generator 13 which could also be termed a coefficient former variable (not linear) in its transfer characteristic and contains transmission channels 17 and 18 adapted to be alternately connected to filtering means 7 under the influence of detector and control circuit 20 by means of a change-over switch 19 illustrated schematically. FIG. 2 which depicts the "normal state" shows that usually transmitter 17 is connected which allows the passage of the signals arriving on line 6 preferably unchanged.

The output signal of pulse-train generator 13 is supplied through a subtractor 25 to integrator 26 producing acceleration signal AS 2 and being likewise designed as an accumulator register. Coefficient former 27 divides the output signal of integrator 26 by a factor M and transmitting the result, on the one side, to velocity integrator 28 and, on the other side, the result is fed back to the negative input of subtractor 25.

Coupled from the output of velocity integrator 28 via terminal 14 is an output signal AS 1 which is representative of the wheel velocity in the form of a variable numerical value.

This output signal of integrator 28 is supplied to one of the three inputs of summer stage 10 receiving at its second input the output signal of acceleration integrator 26 and at its third input the output signal of dead-zone circuit 5, this signal being multiplied by a factor N in coefficient former 29. In particular this latter filter branch serves to adjust the signal issued by summer stage 10 and fed back to the negative input of subtractor 3 to variations occurring in input signal ES as quickly as possible to thereby attenuate the system's tendency to oscillate.

As in the case of FIG. 1, detector and control circuit 20 connected to the output of integrator 4 via line 16 comprises a dead-zone circuit 21, designed as a discriminator, and a control circuit 22 whose configuration corresponding to one possible embodiment shall be described in conjunction with an embodiment of pulse-train generator 13 in FIG. 3.

In FIG. 3, control circuit 22 is driven dependent on upper threshold levels OG 1 and OG 2 and lower threshold levels UG 1 and UG 2, wherein, in the event of lower threshold UG 2 or upper threshold OG 2 being exceeded, dead-zone circuit 21 issues a pulsed signal of short duration and wherein corresponding pulsed signals arrive from dead-zone circuit 5 (FIG. 2) if signal AS 3—also called jerk signal—which is representative of the derivative of acceleration, causes the lower UG 1 or upper OG 1 threshold level of dead-zone circuit 5 to be exceeded.

The pulses issued when the respective threshold levels UG 2, OG 2 or UG 1, OG 1 are exceeded cause setting or resetting of two flip flops 31 and 32 which combine to form control circuit 22.

In this arrangement it is to be understood that a logic 0 level will normally appear at the Q-outputs of flip flops 31 and 32 which will be replaced by a logic 1 level only if the relevant flip flop has been set by a pulse issued because OG 2 or UG 2 threshold levels have been exceeded, i.e., if dead-zone circuit 21 has determined the presence of a disturbed condition.

In the normal case, the logic 0 level appearing at the Q-outputs of flip flops 31 and 32 is applied to the two inputs of AND gate 44 via inverters 42 and 43 as a logic 1 level, thereby keeping AND gate 45 open for pulses arriving on line 6 which are then transmitted, via OR gate 38, to subtractor 25 inserted downstream from controllable pulse-train generator 13.

In the normal case, controllable pulse-train generator 13 may be regarded as a multiplier multiplying the input signal arriving on line 6 by factor 1, i.e., transmitting it on to subsequent subtractor 25 unchanged.

In contrast, if one of the two flip-flops is set by a signal arriving on the relevant line from dead-zone circuit 21 because the latter has sensed a disturbed condition, a logic 1 level will appear either on line 33 or on line 34 which will be shifted to a logic 0 level either by inverter 43 or by inverter 42. As a result, gate 44 will issue a logic 0 level at its output, and gate 45 will be blocked as long as flip flop 31 or 32 is set. In this case, switch 19 shown in FIG. 2 symbolically is switched to the other position in FIG. 2, and transmission channel 17 is disengaged from filtering means 7.

For example, if a disturbed condition is characterized by dead-zone circuit 21 having determined, by the contents of jerk integrator 4, that the second upper threshold level OG 2 is exceeded, flip flop 32 will be set as a result of which a logic 1 level will appear at its Q-output. Thereby, AND gate 35 will be opened, having applied to its second input output pulses from pulse generator 41 each of which is multiplied by factor +1 in multiplier 39. Because it is possible to choose the repetition rate of pulse generator 41 such that it corresponds to a specific predetermined acceleration, the output of gate 35 will be a pulse repetition rate which is representative of this acceleration and transmitted via OR gates 37 and 38 to subtractor 25 to be added up in the acceleration filter (integrator 26 with feedback).

On the other hand, if a disturbed condition is characterized by dead-zone circuit 21 having determined that the second lower threshold level UG 2 is exceeded, it is not flip flop 32 but flip flop 31 that will be set, and not AND gate 35 but AND gate 36 will be opened which is connected to pulse generator 41 via multiplier 40. Multiplier 40 will multiply the output pulses of pulse generator 41 with factor −1, providing at the output of AND gate 36 a pulse train which is representative of a corresponding negative acceleration (deceleration).

For the sake of completeness only, it is to be understood that, instead of connecting AND gate 44 via lines 33 or 34 to the $\overline{Q}$-outputs of flip flops 31 and 32, AND gate 44 could also be connected to their Q-outputs, so avoiding the need for inverters 42 and 43.

In FIG. 4, the lowermost line shows input signal ES which is supplied to the positive input of subtractor 3 of comparator 2 via terminal 1. This input signal comprises a series of pulses obtained, for example, by having a ring gear rotate in unison with the associated vehicle wheel, the gear's teeth producing a surge of short duration whenever they pass an inductive sensor. In a known manner, the signal thereby obtained will be processed by a pulse shaper and synchronized with the clock of the whole system such that the information conveyed by the pulse spacings, namely, wheel rotational speed and its time derivatives, in particular acceleration and jerk occurring at this wheel, is maintained.

The sections of the pulse train applied to the input of the closed-loop control system in FIG. 4 show the following: section I shows initially a minor wheel deceleration followed by a certain acceleration, section II shows a sudden high acceleration such that the jerk signal indicative of this variation of acceleration is to be regarded as excessive. In Section III, the wheel rotational speed decreases again which is reflected in the progressively increasing pulse spacings, and this occurs in section IV to such a high extent that the associated jerk signal may be regarded as excessive. In section V, the wheel rotational speed is increased again because of a positive acceleration.

The above-described processes which are reflected in the signal depicted in the lowermost line of FIG. 4 will become substantially more clear from the graphical representation thereabove in which the contents Z of the jerk integrator 4 of FIG. 2 are shown dependent on input signal ES shown therebelow.

However, before entering into details on the course of the contents of jerk integrator 4, the general mode of function of the digital closed-loop control system shall be briefly explained.

The pulse train of the input signal is scanned with a fixed clock which corresponds to the word clock, i.e., the processing rate of the binary digit words in the registers. The unavoidable scanning jitter is suppressed by the filter characteristic of the closed-loop controlling means.

The closed control loop of this invention operates such that via subtractor 3 a certain numerical value with positive sign digit is entered into the accumulator register forming jerk integrator 4 whenever a pulse of input signal ES is scanned at terminal 1, while on each word clock the numerical value appearing at the output of summer stage 10 is subtracted from the contents of register 4 by applying this numerical value to the negative input of subtractor 3.

Assuming a steady state in which the wheel velocity does not change, and assuming further that at this given wheel velocity the repetition rate of the pulses applied to input 1 is one-third of the word clock rate, there occur precisely three subtracting operations for every one adding operation in jerk integrator 4.

In order to avoid that this causes a change in the contents of jerk integrator 4 in accordance with the steady state, it is therefore necessary for the numerical value appearing at the output of summer stage 10 to be one-third of the fixed numerical value assigned to an input pulse.

Because in the steady state neither dead-zone circuit 5 nor acceleration integrator 26 supply an output signal, the numerical value appearing at the output of summer stage 10 is identical with the contents of velocity integrator 28 or with output signal AS 1 appearing at terminal 14.

In FIG. 4, the contents Z of jerk integrator 4 are shown diagrammatically above pulses ES, there being also depicted threshold levels OG 1 and UG 1 realized by dead-zone circuit 5, and threshold levels OG 2 and UG 2 realized by dead-zone circuit 21.

The diagram shows that signals are produced when the threshold levels are exceeded, the signals being supplied to filtering means 7 when the thresholds of dead-zone circuit 5 are exceeded, whereas in the event of the thresholds of dead-zone circuit 21 being exceeded, an intervention in the operation of filtering means 7 will occur in a manner to be explained hereinafter.

Dead-zone circuit 5 ensures advantageously a suppression of quantization errors and of short-duration variations of the input pulse spacings which are either due to wheel "hunting" (in the sense of minor periodic increases and decreases in speed) which is of no further interest to an antiskid control system, or are due to pure disturbances as they occur, for instance, as a result of inaccuracies in the tooth pitch of the ring gear rotating in unison with the associated wheel, or as a result of scanning jitter of the input pulses appearing at terminal 1, the jitter being caused by synchronization of the pulses issued by the wheel sensor with the word clock of the closed-loop control system, as already mentioned.

The signal transmitted by dead-zone circuit 5 to filtering means 7 is supplied to controllable pulse-train generator 13, reaching at the same time, via line 6, AND gate 45, as shown in FIG. 3.

Because, as shown in the uppermost line of FIG. 4, AND gate 44 issues a logic 1 level, AND gate 45 allows passage of the +1 signal of dead-zone circuit 5, so that this signal reaches summer stage 25 via OR gate 38 and is added to the contents of the acceleration filter (integrator 26 with feedback). On the one hand, the latter's output signal is supplied to a further processing state via terminal 15, and, on the other hand, it is supplied to the second input of summer stage 10 where it results in another advance increase of the numerical value fed back to comparator 2 input, compared to the numerical value held in velocity integrator 28.

Further, the output signal of acceleration filter 26 is divided by coefficient former 27 and then supplied to velocity integrator 28 whose contents are thus adjusted to the increase in wheel velocity determined by dead-zone circuit 5.

At the same time, the output signal of coefficient former 27 is fed back to the negative input of subtractor 25, so that in all cases in which dead-zone circuit 5 issues no further signals, the contents of acceleration integrator 26 drop again to zero with a corresponding time constant, as a result of which no further input signals are supplied to velocity integrator 28 and its numerical value remains constant again.

FIG. 4 shows, however, a different pattern of the input signal because the two subsequent input pulses appear in such rapid succession that also the second upper threshold level OG 2 is exceeded after the first upper threshold level OG 1 has been exceeded. This condition is detected by dead-zone circuit 21 contained in detector and control circuit 20, the former issuing a positive pulse of short duration which is applied to the set input of flip flop 32 whose Q-output will thus shift from a logic 0 level to a logic 1 level.

The logic 1 level appearing on line 33 is inverted in inverter 43 so that AND gate 44 produces at its output a logic 0 level which blocks AND gate 45, thus inhibiting the passage of the signals issued by dead-zone circuit 5.

Instead, the logic 1 level generated on line 33 causes opening of AND gate 35 receiving at its second input the pulses of pulse generator 41 multiplied by factor +1 and transmitting them, via OR gate 37, to OR gate 38 and thence to subtractor 25 preceding acceleration integrator 26.

The exceeding of the second upper threshold level OG 2 thus causes shifting of the multiplying function (multiplication factor 1) fulfilled by arrangement 13 in the preceding "normal state" to a limiting function in which, independent of the signal delivered by dead-zone circuit 5, the pulse train generated by oscillator 41 is passed on at a constant repetition rate.

As already mentioned, this repetition rate is chosen to be representative of a certain acceleration, and it has proved an advantage to use the same absolute value for both positive and negative accelerations.

Thus, in the case of a "disturbance" which exists if the second upper threshold level OG 2 is exceeded, shifting of controllable pulse-train generator 13 causes a constant value to be fed into acceleration integrator or register 26 via subtractor 25, as a result of which output signal AS 1 of filtering means 7 is no longer a true image of the disturbed true wheel velocity signal but represents an extrapolated signal. By suitably choosing the repetition rate of pulse generator 41, it is achieved that this extrapolated signal, in particular with wheel decelerations, follows a pattern corresponding to the maximum possible motor vehicle deceleration. It is thereby ensured that the extrapolated signal generated while the "disturbed condition" lasts, while not tracing all the details of the accelerations and decelerations occurring at the wheel, approaches as fast as possible a value to which also the actual wheel velocity signal tends, so that after a shortest possible time the two signals coincide again to such an extent that controllable pulse-train generator 13 can be shifted back to "normal" again in which state it allows passage of the pulses supplied by dead-zone circuit 5 preferably unchanged.

In FIG. 4, this shifting back is illustrated on the 10th input pulse, i.e., it will not take place if the second upper threshold level OG 2 is crossed towards a lower value but only after the contents Z of jerk integrator 4 have dropped below the first upper threshold level OG 1. It is thereby achieved that the extrapolated signal progressively blends into the true wheel velocity signal then again generated at the filter output.

A process analogous to the one described in connection with threshold levels OG 1 and OG 2 is illustrated in FIG. 4 for the lower threshold levels UG 1 and UG 2 corresponding to a wheel deceleration.

In FIG. 5, the inverted output signal of gate 44 is shown in the lowermost line, the appearance of a logic 1 level being indicative of a "signal disturbance" and a logic 0 level being indicative of a "normal state".

In the graph shown above the gate signal, velocity v of a wheel is plotted against time, with the line drawn in full being representative of the true wheel velocity, while the dashed lines denote the extrapolated signal generated when a sensor disturbance occurs, and the vertical lines reflect disturbances as they occur, for example, as a result of a loose contact in the line leading from the wheel sensor to the closed loop control system or the pick-up of a high-frequency interference.

As shown in FIG. 5, the velocity of the monitored wheel initially increases up to a point where it continues on a horizontal tangent line. Briefly after the attainment of this "constant" speed, an interference occurs, causing the actual wheel velocity signal to drop sharply. This would amount to a change in acceleration, i.e., a jerk, since it cannot occur in physically possible systems. This condition is sensed by dead-zone circuit 21 of detector and control circuit 20 which is indicated by a fan 50 in FIG. 5. This fan is opened by the second upper and lower threshold levels for the jerk signal, i.e., by threshold levels OG 2 and UG 2 defined by dead-zone circuit 21, and defines an "expectancy zone" in which alone the monitored signal could have moved on in a physically meaningful way if no disturbance had occurred.

The fact that the signal actually occurring at the input of the closed-loop control system leaves the area of this expectancy fan is interpreted as a disturbance by the closed-loop control system of the present invention, and the detector and control circuit shifts filtering means 7 to a slower response action so that, instead of a signal corresponding to the disturbed input signal, an extrapolated signal appears at the velocity output 14 of filtering means 7, shown in FIG. 5 by the dashed line.

This dashed line initially has a slope different from the fixed acceleration predetermined by oscillator 41, because the numerical values supplied by oscillator 41 to acceleration integrator 26 via multiplier 40, AND gate 36, OR gates 37 and 38 and subtractor 25 are added to the acceleration value which is already stored in integrator 26 and decays only gradually. It is thereby achieved by the present invention that the dashed line in FIG. 5 initially maintains invariably the same slope which the undisturbed, true wheel velocity signal had a short time prior to the occurrence of the disturbance, and then only slowly blends into a curve with the positive or negative slope predetermined by oscillator 41.

The second expectancy fan 51 illustrated in FIG. 5, which orients itself by the extrapolated signal because of the continued existence of the disturbance, identifies a place where the disturbed input signal of the closed-loop control system possesses a very high positive slope which can only be interpreted by the occurrence of an excessive, i.e., physically not meaningful, positive jerk. Here, the second upper threshold is crossed towards a lower value so that controllable pulse-train generator 13, without returning to "normal", is shifted so as to supply a pulse train indicative of a corresponding positive acceleration instead of the pulse train supplied until then which was indicative of a negative acceleration.

In FIG. 5, this condition is reflected in an upwardly bent dashed line which is bent downwardly again in fan 52 because then an interference occurs again, causing the second lower threshold UG 2 to be exceeded.

In the further course of events, the signal appearing at the input of the closed-loop control system is not disturbed for a period of time of some length and initially passes through a minimum after which it rises again.

However, since in the area of fan 52 the distance between the extrapolated signal generated during that period of filtering means 7 and the true wheel velocity signal is very large, the first lower threshold UG 1 is not initially crossed towards a higher value so that filtering means 7 continues to be in the "disturbed mode".

Because in this operating state the filtering means' response action is substantially slower than under normal conditions, the extrapolated signal produced by it is not capable of tracing in all detail the monitored wheel's velocity pattern occurring in this period. Instead, the extrapolated signal progressively decreases with a predetermined slope until the two signals have approximated each other to a degree in which the first lower threshold level UG 1 is again exceeded. In the graph of FIG. 5, this occurs in the area of fan 53.

In the area of fans 54 and 55, a disturbance is shown which only leads to a brief disengagement of the extrapolated signal from the true wheel velocity signal, whereas the disturbance occurring in the areas of fans 56 and 57 results again in a variation of some duration between the true wheel velocity signal and the extrapolated signal.

As a whole, the illustration in FIG. 5 shows that the global pattern of the true wheel velocity signal is essentially correctly reproduced by the closed-loop control system of the present invention, in spite of extraordinarily strong disturbance effects, while at the same time the disturbances are nearly completely suppressed. The velocity signal thereby obtained at the output 14 of filtering means 7 represents an optimum with respect to the two contradicting requirements which are a good interference suppression, on the one hand, and a fastest possible response action or best possible resolution, on the other hand, and this velocity signal is adapted to be supplied to the electronic circuitry for further processing in a highly advantageous manner, the electronic circuitry controlling the brake pressure at the individual wheels so as to avoid a locked condition of one or several wheels and to ensure optimum vehicle deceleration.

While we have described above the principles of our invention in connection with specific apparatus, it is to be clearly understood that this description is made only by way of example and not as a limitation to the scope of our invention as set forth in the objects thereof and in the accompanying claims.

We claim:

1. A method for the conversion of a variable physical quantity occurring in a vehicle represented by frequency variations being temporarily disturbed at times into a numerical signal proportional to said frequency variations suitable for further processing comprising the steps of:
    converting said frequency variations into signals corresponding to a time derivative of said physical quantity for comparison to a plurality of predetermined threshold values; and
    integrating and transforming said frequency variations and said converted signals combined therewith as a feedback signal to generate said numerical signals, said numerical signals being generated on the basis of the instantaneous value of said converted signals with a change of transfer characteristic whenever said converted signals are outside of said plurality of predetermined threshold values.

2. A method according to claim 1, wherein
said time derivative is a first derivative of said physical quantity.

3. A method according to claim 1, wherein
said time derivative is a second derivative of said physical quantity.

4. A method according to claims 1, 2 or 3, wherein
said step of integrating includes
    performing at least one integration on a predetermined fixed quantity substituted for actual values of said converted signal lying outside said plurality of predetermined threshold values.

5. A method according to claim 4, wherein
said step of integrating includes
    blanking out interference signals of minor, permissible magnitude.

6. A method according to claims 1, 2 or 3, wherein
said step of integrating includes
    blanking out interference signals of minor, permissible magnitude.

7. A circuit for converting a variable physical quantity occurring in a vehicle represented by frequency variations being temporarily disturbed at times into a numerical signal proportional to said variations for further processing comprising:
    a comparator including
        a subtractor having a negative input and a positive input, said positive input receiving a pulse train whose frequency varies proportional to said physical quantity,
        a first integrator coupled to the output of said subtractor, and
        a dead-zone detector coupled to the output of said first integrator, said dead-zone detector providing a first distinct output signal when the output signal of said first integrator is below a predetermined first lower threshold level, a second distinct output signal when the output signal of said first integrator is above a predetermined first upper threshold level, and a third distinct output signal of said first integrator is between said first lower and said first upper threshold levels;
    a filtering means of the n-th order coupled to the output of said dead-zone detector having an output coupled to said negative input, where n is an integer greater than zero, said filtering means including at least one section having a variable transfer characteristic; and
    a detector and control circuit coupled to said dead-zone detector and said one section to detect a signal representative of a time derivative of a value proportional to said physical quantity and to provide a control signal for said one section to vary said transfer characteristic if said time derivative signal departs from an area bounded by a predetermined second lower threshold level and a predetermined second upper threshold level, said first lower and said first upper threshold levels lying within said second lower and said second upper threshold levels.

8. A circuit according to claim 7, wherein
n is equal to two, and
said time derivative signal is a first time derivative of said value proportional to said physical quantity.

9. A circuit according to claim 7, wherein
n is equal to two, and
said time derivative signal is a second time derivative of said value proportional to said physical quantity.

10. A circuit according to claims 7, 8 or 9, wherein
said control signal controls said one section to slow down the response action of said filtering means.

11. A circuit according to claim 10, wherein
said control signal controls said one section to reset to its original transfer characteristic when said time derivative signal returns to said area bounded by said second lower and said second upper threshold levels.

12. A circuit according to claim 11, wherein
said one section is reset to its original transfer characteristic by said control signal when said time derivative signal is detected to be between said first lower and said first upper threshold levels.

13. A circuit according to claim 7, wherein
said control signal controls said one section to reset to its original transfer characteristic when said time derivative signal returns to said area bounded by said second lower and said second upper threshold levels.

14. A circuit according to claim 13, wherein
said one section is reset to its original transfer characteristic by said control signal when said time derivative signal is detected to be between said first lower and said first upper threshold levels.

15. A circuit according to claims 7, 8 or 9, wherein
said transfer characteristic of said one section is quasi-continuously varied by said control signal.

16. A circuit according to claims 7, 8 or 9, wherein said transfer characteristic of said one section is abruptly shifted from one transfer characteristic to another by said control signal.

17. A circuit according to claims 7, 8 or 9, wherein said filtering means further including
   a second integrator coupled to the output of said one section, and said one section includes
   a controllable pulse train generator.

18. A circuit according to claim 17, wherein said controllable pulse generator includes
   a proportional section operable in the absence of said control signal, and
   a constant-signal generator operable in the presence of said control signal.

19. A circuit according to claim 18, wherein said proportional section has an amplification factor of one.

20. A circuit according to claim 18, wherein said constant-signal generator provides a pulse train having a fixed repetition rate, and
   said controllable pulse generator further includes
      a first multiplier coupled to the output of said constant-signal generator to impart one of a positive value and a negative value to said pulse train dependent upon whether one of said second lower and said second upper threshold levels is exceeded, and
      a second multiplier coupled to the output of said constant-signal generator to impart the other of said positive value and said negative value to said pulse train dependent upon whether the other of said second lower and said second upper threshold levels is exceeded.

21. A circuit according to claim 20, wherein said physical quantity is the rotational velocity of a vehicle wheel.

22. A circuit according to claims 7, 8 or 9, wherein said physical quantity is the rotational velocity of a vehicle wheel.

* * * * *